June 22, 1926.

G. B. BURNHAM 1,589,680

PROCESS OF SEPARATING SOLIDS OF DIFFERENT SIZE OR SPECIFIC GRAVITY

Filed Oct. 4, 1924

INVENTOR
GEORGE B. BURNHAM.
BY White Prost & Evans
HIS ATTORNEYS.

Patented June 22, 1926.

1,589,680

UNITED STATES PATENT OFFICE.

GEORGE B. BURNHAM, OF RENO, NEVADA, ASSIGNOR TO BURNHAM CHEMICAL COMPANY, OF RENO, NEVADA, A CORPORATION OF NEVADA.

PROCESS OF SEPARATING SOLIDS OF DIFFERENT SIZE OR SPECIFIC GRAVITY.

Application filed October 4, 1924. Serial No. 741,671.

The invention relates to a process of separating solids of different size or different specific gravity submerged in a liquid, the object of the invention being to separate or partially separate the solids of one size or specific gravity from the solids of another size or specific gravity.

Another object of the invention is to provide a process of separating crystals of different salts contained in the brine from which they have crystallized out.

The invention possesses other advantageous features, some of which, with the foregoing, will be set forth at length in the following description, where I shall outline in full the process of my invention and describe one form of apparatus which may be employed in carrying out the process. In the accompanying drawings I have shown one form of apparatus for carrying out the process, the apparatus being claimed in my copending application, Serial Number 739,743 filed September 24, 1924 in the United States Patent Office.

Referring to said drawings.

Figure 1:
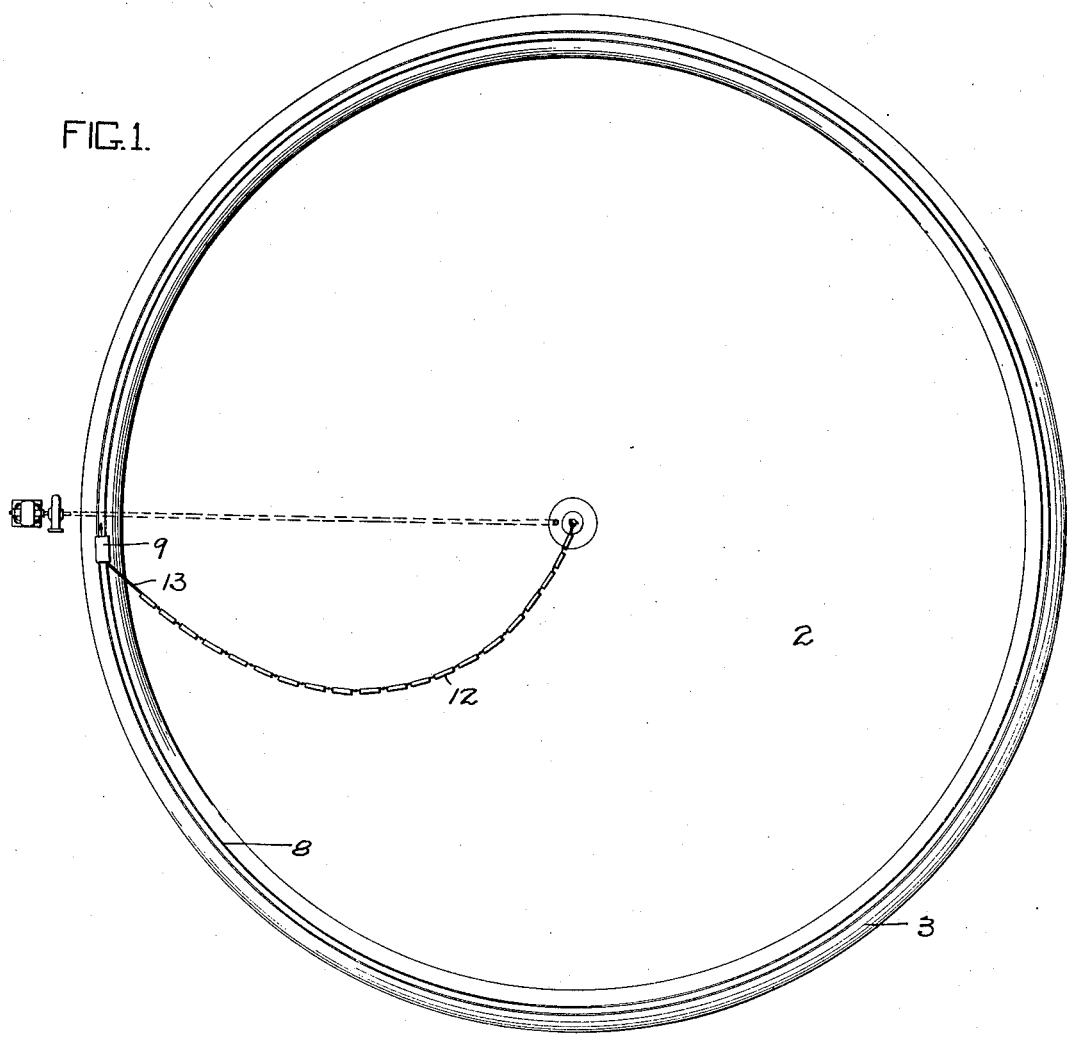
Figure 1 is a plan view of an apparatus for carrying out the process of my invention.
Figure 2:
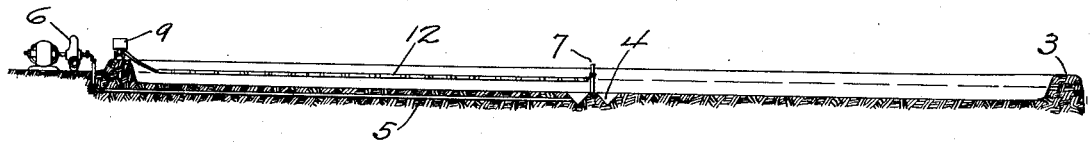
Figure 2 is a vertical cross section of the apparatus shown in Figure 1.

The process is particularly useful in separating crystals of one salt from a mixture of crystals submerged in a brine from which the crystals have been formed. In the recovery of salts from the saline waters of lakes, such as Searles Lake in California, the brine, after having been concentrated by evaporation, is introduced into ponds in which the salts are crystallized out, several different salts usually crystallizing out at the same time. It is desirable to separate these salts and the object of the present invention is to provide a process for separating or partially separating the different salts from the mixture of deposited crystals. It is to be understood however that the process is not limited for use in connection with the separation of crystals of salt but may be used in connection with the separation and recovery from a liquid, of any solid particles, which may be placed in suspension by agitation of the liquid.

In accordance with my invention, the liquid is agitated to place the crystals temporarily in suspension and at the same time to produce currents in the body of the liquid toward a selected point therein. The suspended crystals are carried by the currents toward the selected point. The smaller crystals are held in suspension in the liquid for a longer time than the larger crystals, so that they are carried further toward the selected point and the crystals of lesser specific gravity are held in suspension in the liquid for a longer time than the crystals of greater specific gravity so that the crystals of lesser specific gravity are carried further toward the selected point. By continuously moving an agitator through the body of liquid, successive portions of the body of liquid are successively agitated to produce suspension of the crystals. The agitation exists only temporarily and after the passage of the agitator, the agitated liquid again becomes quiescent permitting the suspended crystals to settle and by continuously moving the agitator through the body, every portion of the body of liquid is alternately agitated and quiescent and during the agitated periods, there are produced currents directed toward a selected point in the body of liquid, so that the lighter or smaller crystals are moved toward the selected point and to the selected point much more rapidly than the larger or heavier crystals so that a segregation of the crystals occurs and, by removing the crystals from the selected point as they accumulate, a partial separation of the crystals is obtained.

In the process of crystallizing out salts from Searles Lake brine, by solar or natural temperatures, several different crystals are usually deposited out at the same time and the crystals of the various salts are usually of different size. For instance, borax and sodium chloride are frequently crystallized out together. The borax crystals are fine and the sodium chloride crystals are coarse. Further, the specific gravity of the borax crystals is approximately 1.7 and the specific gravity of the sodium chloride crystals is approximately 2.16. Agitation of the liquid will place the borax crystals and the sodium chloride crystals in suspension, but due to the coarseness of the sodium chloride crystals and fineness of the borax crystals, the borax crystals will remain in suspension for a longer time, so that, if the liquid is caused to flow toward a selected point, during the time that the crystals are in suspension, the borax crystals will be carried a further distance toward such point than the sodium chloride crystals. At other stages of the crystallizing process, borax and Glauber's salt crystallize out at the same time and since the Glauber's salt crystals are coarse and the borax crystals fine, these two crystals may be separated from each other in the same manner. The process is also applicable to the separation of crystals of glaserite, which are fine grained, from the coarse crystals of sodium chloride and/or Glauber's salt.

Any suitable type of apparatus may be provided for carrying out the process of my invention but I have had excellent results with the apparatus shown in the accompanying drawing. This apparatus comprises a container, preferably in the form of a large circular pond 2, which pond is preferably formed by throwing up a circular dyke 3, extending above the plane of the surrounding terrain. The pond should preferably be large in diameter, and in one which I have constructed, the pond is 575 ft. in diameter. The pond is shallow, preferably not more than four feet in depth, and brine is introduced into the pond until it acquires a depth of from one-half foot to two feet. Formed at the center of the pond is a sump 4, into which the suction pipe 5, of the pump 6, extends. At the center of the sump there is arranged a vertical post or support 7. The dyke 3, is preferably provided with a trackway 8, and a tractor or locomotive 9 operates on the trackway.

The salt may be partially or wholly crystallized out from the brine before the brine is introduced into the pond, or the crystals may be formed in the pond.

The apparatus includes means for agitating the liquid in the pond in such manner as to place the crystals in suspension and to produce currents in the direction of the sump 4. Connected to the central support 7, and extending to the tractor 9, is a boom or inverted weir 12, which is partially submerged in the liquid, the bottom edge of the boom or inverted weir being spaced away from the bottom of the pond. In practice I have found that a submersion of from one to three inches of the lower surface of the boom is sufficient to produce excellent results. The boom is preferably made of wooden boards or logs hinged together and floating in the pond, the inner end of the string of boards being connected to the support 7, and the outer end being connected to the tractor 9, by a cable 13. The inverted weir is preferably flexible and of greater length than the radius of the pond, so that as the tractor draws the weir around the pond, the weir assumes a concave shape, all parts of the weir being at an angle to the radius of the pond. Because of the angle of the weir or of the boards of which the weir is formed, a current is created in the wake of the weir as it is drawn around the pond and this current is in the direction of the center of the pond. The agitation of the liquid in the wake of the weir, caused by the movement of the weir around the pond, places the crystals in suspension and the current formed by the movement of the weir causes the suspended particles to move inward toward the center of the pond. The smaller or lighter crystals are carried further by the current than the larger or heavier crystals. The crystals may be moved inwardly only a short distance for each rotation of the weir, but as the weir continues to rotate, the crystals are moved inwardly toward the center in a step-by-step movement so that they eventually accumulate at the center, the lighter or finer crystals accumulating first and the heavier or coarser crystals accumulating thereafter. The movement of the weir through the liquid produces eddy currents which place the crystals in suspension and due to the angularity of the boards of the weir, the eddy currents tend generally in the direction of the center of the pond, thus causing the suspended particles to be carried toward the center of the pond. After the weir passes a given point in the pond, the liquid again becomes quiescent and the suspended crystals settle to the bottom at a point closer to the center than their previous location. The crystals are thus given a step-by-step movement toward the center of the pond, the smaller crystals being carried in each instance through a larger step than the coarser crystals. Since the pond is very large with respect to its depth and since the tractor moves slowly, making a revolution about once in three minutes, the agitation in the pond is local and has an opportunity of subsiding before the weir again passes over the same point, so that the crystals or at least the coarse crystals are not maintained in a continual state of suspension.

When a super-saturated solution of brine is introduced into the pond, the agitation caused by the moving weir is sufficient to cause crystallization of some of the salts and then these salts are accumulated at the center of the pond by the further agitation and currents caused by the movement of the weir. In some instances, very coarse crystals may be produced and these crystals may not be disturbed by the eddy currents which are produced by the movement of the weir, so that the fine crystals may be definitely separated from these very coarse crystals.

While I have described the process of my invention in connection with the separation of fine crystals from coarse crystals, it is to be understood that the process may be used in connection with the separation of solids of different sizes or different specific gravities, which may be placed in suspension in a liquid by agitation thereof. As the solids or crystals accumulate at the center of the pond, they are removed by the pump or by other suitable means and are then washed or otherwise further treated to produce a definite separation of the solids or crystals.

I claim:

1. The process of separating solids of different specific gravity, or of different size, the solids being submerged in a large shallow body of liquid, which comprises successively agitating successive portions of the liquid whereby the solids at the agitated portion are placed temporarily in suspension and causing a current in the agitated portion of the liquid toward a selected point, the lighter or smaller solids being carried further by the current than the heavier or larger solids.

2. The process of separating solids of different specific gravity, or of different size, the solids being submerged in a large shallow body of liquid, which comprises successively agitating successive portions of the liquid whereby the solids at the agitated portion are placed temporarily in suspension and causing a current in the agitated portion of the liquid toward a selected point, the lighter or smaller solids being carried further by the current than the heavier or larger solids before the liquid becomes quiescent and repeatedly temporarily agitating successive portions of the liquid whereby the lighter or smaller solids are moved to the selected point.

3. The process of separating solids of different specific gravity, or of different size, the solids being submerged in a large shallow body of liquid, which comprises moving an agitator through the liquid whereby successive portions of the liquid are agitated and currents toward a selected point are caused in the agitated portion, the agitation placing the solids temporarily in suspension and the currents carrying the lighter or smaller temporarily suspended solids further toward the selected point than the heavier or larger solids.

4. The process of separating solids of different specific gravity or of different size, the solids being submerged in a large shallow body of liquid, which comprises continuously moving an agitator through the liquid whereby any selected part of the liquid is alternately agitated and quiescent, the agitation of the liquid placing the solids temporarily in suspension, and the movement of the agitator producing currents toward a selected point in the body of liquid.

5. The process of separating solids of different specific gravity or of different size, the solids being submerged in a large shallow body of liquid, which comprises moving an agitator through the liquid and around a selected point therein whereby movement of the agitator agitates the liquid in its wake and causes currents in its wake directed toward the selected point.

6. The process of separating solids of different specific gravity, or of different size, the solids being submerged in a large shallow body of liquid, which comprises successively agitating successive portions of the liquid whereby the solids at the agitated portion are placed temporarily in suspension and causing a current in the agitated portion of the liquid toward a selected point, the lighter or smaller solids being carried farther by the current than the heavier or larger solids before the agitated portion of the liquid becomes quiescent, and repeatedly temporarily agitating successive portions of the liquid whereby the lighter or smaller solids are moved to the selected point, and removing the solids collected at the selected point.

7. The process of separating solids of different specific gravity or of different size, the solids being submerged in a large shallow body of liquid, which comprises continuously moving an agitator through the liquid whereby any selected part of the liquid becomes alternately agitated and quiescent the agitation of the liquid placing the solids temporarily in suspension, and the movement of the agitator producing currents toward a selected point in the body of the liquid whereby the lighter or smaller solids collect at the selected point and removing the collected solids.

8. The process of separating differently sized crystals of different salts submerged in a large shallow body of brine which comprises continuously moving an agitator through the brine about a fixed point therein, whereby currents are caused toward said point, the movement of the agitator agitating the brine in its wake and placing the crystals temporarily in suspension, the currents carrying the suspended crystals toward the selected point and removing the crystals as they collect at the selected point.

9. The process of recovering salts from super-saturated brine contained in a large shallow pond which comprises moving an agitator continuously thru the brine whereby different salts are crystallized therefrom, and producing currents in the brine toward a selected point therein whereby the crystallized salts are placed in suspension and carried toward the selected point.

10. The process of recovering salts from super-saturated brine contained in a large shallow pond which comprises moving an agitator continuously through the brine about a fixed point therein, whereby the agitation of the brine crystallizes out fine crystals and coarse crystals, the movement of the agitator placing the crystals in suspension temporarily, and producing a current in the wake of the agitator toward the fixed point, the finer crystals being carried by the current a greater distance than the coarser crystals.

11. The process of separating solids of different size or specific gravity, the solids being contained in a normally quiescent liquid, which comprises locally agitating the liquid whereby the salts are placed temporarily in suspension, and producing a local current toward a fixed point whereby the lighter or smaller solids are carried to the fixed point and the heavier or larger solids are left behind.

In testimony whereof, I have hereunto set my hand.

GEORGE B. BURNHAM.